US011505206B2

(12) United States Patent
Hegde et al.

(10) Patent No.: US 11,505,206 B2
(45) Date of Patent: Nov. 22, 2022

(54) WRONG-WAY DRIVING DETECTION AND COLLISION MITIGATION

(71) Applicant: GM GLOBAL TECHNOLOGY OPERATIONS LLC, Detroit, MI (US)

(72) Inventors: Bharatkumar Hegde, Bloomfield Hills, MI (US); Steven E. Muldoon, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 30 days.

(21) Appl. No.: 17/120,379

(22) Filed: Dec. 14, 2020

(65) Prior Publication Data

US 2022/0185312 A1   Jun. 16, 2022

(51) Int. Cl.
| | |
|---|---|
| *B60W 30/18* | (2012.01) |
| *B60W 50/16* | (2020.01) |
| *B60W 30/095* | (2012.01) |
| *B60W 40/10* | (2012.01) |
| *H04W 4/40* | (2018.01) |
| *B60W 10/18* | (2012.01) |

(52) U.S. Cl.
CPC ............ *B60W 50/16* (2013.01); *B60W 10/18* (2013.01); *B60W 30/0953* (2013.01); *B60W 40/10* (2013.01); *H04W 4/40* (2018.02); *B60W 2520/06* (2013.01); *B60W 2556/50* (2020.02)

(58) Field of Classification Search
CPC .. B60W 50/16; B60W 10/18; B60W 30/0953; B60W 40/10; B60W 2520/06; B60W 2556/50; H04W 4/40
See application file for complete search history.

(56) References Cited

U.S. PATENT DOCUMENTS

| | | |
|---|---|---|
| 6,405,106 B1 | 6/2002 | Sheth et al. |
| 7,360,615 B2 | 4/2008 | Salman et al. |
| 7,539,562 B2 | 5/2009 | Maguire et al. |
| 7,653,469 B2 | 1/2010 | Bai et al. |
| 8,036,785 B2 | 10/2011 | Maguire et al. |
| 8,073,605 B2 | 12/2011 | Naik et al. |
| 8,095,290 B2 | 1/2012 | Smyth et al. |
| 8,099,220 B2 | 1/2012 | Kim et al. |
| 8,214,122 B2 | 7/2012 | Krupadanam et al. |
| 8,239,076 B2 | 8/2012 | McGarry et al. |
| 8,260,481 B2 | 9/2012 | Naik et al. |
| 8,290,637 B2 | 10/2012 | Krupadanam et al. |

(Continued)

FOREIGN PATENT DOCUMENTS

WO   WO-2015/051289 A1   4/2015

*Primary Examiner* — Hongmin Fan

(57) ABSTRACT

A system includes a processor and a memory storing instructions which when executed by the processor configure the processor to receive data from a plurality of sensors in a vehicle, the sensors including a Global Navigation Satellite System receiver, accelerometers, gyroscopes, and magnetometers; and to determine a location of the vehicle and a direction of motion of the vehicle based on the data and a history of locations of the vehicle in prior N seconds, where N is a number greater than 0. The instructions configure the processor to determine a permitted driving direction for the vehicle based on the location of the vehicle and a map database; and to detect whether the vehicle is moving in a wrong direction based on the permitted driving direction and the direction of motion of the vehicle.

20 Claims, 3 Drawing Sheets

(56) References Cited

U.S. PATENT DOCUMENTS

| | | |
|---|---|---|
| 8,374,740 B2 | 2/2013 | Druenert et al. |
| 8,392,091 B2 | 3/2013 | Hebbale et al. |
| 8,392,112 B2 | 3/2013 | Bradburn et al. |
| 8,421,648 B2 | 4/2013 | Konaka et al. |
| 8,504,258 B2 | 8/2013 | Tiberg |
| 8,606,483 B2 | 12/2013 | Krupadanam et al. |
| 10,081,360 B2 | 9/2018 | Hu et al. |
| 10,099,702 B2 | 10/2018 | Muldoon et al. |
| 10,186,147 B2 | 1/2019 | Imai |
| 10,215,576 B2 | 2/2019 | Kang et al. |
| 11,335,192 B1 * | 5/2022 | Nayak ................ G08G 1/0112 |
| 2006/0064232 A1 | 3/2006 | Ampunan et al. |
| 2016/0223350 A1 * | 8/2016 | Lewis .............. G08G 1/096725 |
| 2016/0225256 A1 | 8/2016 | Hofsaess et al. |
| 2018/0050693 A1 | 2/2018 | Al-Deek et al. |
| 2018/0218597 A1 | 8/2018 | Kugel et al. |
| 2018/0218608 A1 | 8/2018 | Offenhaeuser et al. |
| 2018/0281782 A1 * | 10/2018 | Salter ................... B60W 30/08 |
| 2019/0185020 A1 * | 6/2019 | Rubinstein ............. G06F 16/29 |
| 2019/0311077 A1 * | 10/2019 | Watanabe ............ G08G 1/0129 |
| 2019/0382016 A1 * | 12/2019 | Chow ................... G06F 16/29 |
| 2021/0063162 A1 * | 3/2021 | Moskowitz .......... G05D 1/0274 |
| 2021/0136699 A1 * | 5/2021 | Scholand ............. H04W 52/34 |

* cited by examiner

WRONG-WAY DRIVING DETECTION AND COLLISION MITIGATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to vehicle control systems and more particularly to a system for wrong-way driving detection and collision mitigation.

Many vehicles are equipped with a monitoring system that monitors whether a vehicle maintains a lane, maintains a distance between other vehicles, etc. The monitoring system typically includes sensors such as cameras that detect lane markings on roadways, surrounding objects such as signs and other vehicles, etc. The monitoring system alerts the driver when another vehicle is too close to the vehicle or when the vehicle crosses a lane marking if a lane change is not intended, which can be detected from a turn signal. The monitoring system can be helpful in reducing the risks of accidents to some extent.

SUMMARY

A system comprises a processor and a memory storing instructions which when executed by the processor configure the processor to receive data from a plurality of sensors in a vehicle, the sensors including a Global Navigation Satellite System receiver, accelerometers, gyroscopes, and magnetometers; and to determine a location of the vehicle and a direction of motion of the vehicle based on the data and a history of locations of the vehicle in prior N seconds, where N is a number greater than 0. The instructions configure the processor to determine a permitted driving direction for the vehicle based on the location of the vehicle and a map database; and to detect whether the vehicle is moving in a wrong direction based on the permitted driving direction and the direction of motion of the vehicle.

In another feature, the processor is further configured to determine the location of the vehicle based on additional data received from a ground station associated with the Global Navigation Satellite System.

In other features, the processor is further configured to determine an attitude of the vehicle based on the data; to receive a grade for the location of the vehicle from the map database; and to detect whether the vehicle is moving in the wrong direction additionally based on attitude of the vehicle and the grade for the location of the vehicle.

In other features, in response to detecting that the vehicle is moving in the wrong direction, the processor is further configured to generate a severity metric based on the location of the vehicle and at least one of speed of the vehicle, type of roadway, time of the day, traffic, weather, and construction information; and to generate an alert based on the severity metric.

In another feature, the processor is further configured to alert an occupant of the vehicle using one or more of audio, video, and tactile alerts in response to detecting that the vehicle is moving in the wrong direction.

In another feature, the processor is further configured to at least one of turn on hazard lights, sound a horn, and flash headlights of the vehicle in response to detecting that the vehicle is moving in the wrong direction.

In another feature, the processor is further configured to at least one of reduce speed of the vehicle, limit maximum speed of the vehicle, and engage automated braking system of the vehicle in response to detecting that the vehicle is moving in the wrong direction.

In another feature, the processor is further configured to modify parameters of an automated braking system of the vehicle in response to detecting that the vehicle is moving in the wrong direction.

In another feature, the processor is further configured to selectively notify a cloud based monitoring system that the vehicle is moving in the wrong direction.

In another feature, the processor is further configured to selectively send a message to a V2X communication system that the vehicle is moving in the wrong direction.

In still other features, a method comprises receiving data from a plurality of sensors in a vehicle, the sensors including a Global Navigation Satellite System receiver, accelerometers, gyroscopes, and magnetometers. The method comprises determining a location of the vehicle and a direction of motion of the vehicle based on the data and a history of locations of the vehicle in prior N seconds, where N is a number greater than 0. The method comprises determining a permitted driving direction for the vehicle based on the location of the vehicle and a map database. The method comprises detecting whether the vehicle is moving in a wrong direction based on the permitted driving direction and the direction of motion of the vehicle.

In another feature, the method further comprises determining the location of the vehicle based on additional data received from a ground station associated with the Global Navigation Satellite System.

In other features, the method further comprises determining an attitude of the vehicle based on the data, receiving a grade for the location of the vehicle from the map database, and detecting whether the vehicle is moving in the wrong direction additionally based on attitude of the vehicle and the grade for the location of the vehicle.

In other features, the method further comprises, in response to detecting that the vehicle is moving in the wrong direction, generating a severity metric based on the location of the vehicle and at least one of speed of the vehicle, type of roadway, time of the day, traffic, weather, and construction information; and generating an alert based on the severity metric.

In another feature, the method further comprises alerting an occupant of the vehicle using one or more of audio, video, and tactile alerts in response to detecting that the vehicle is moving in the wrong direction.

In another feature, the method further comprises at least one of turning on hazard lights, sounding a horn, and flashing headlights of the vehicle in response to detecting that the vehicle is moving in the wrong direction.

In another feature, the method further comprises at least one of reducing speed of the vehicle, limiting a maximum speed of the vehicle, and engaging automated braking system of the vehicle in response to detecting that the vehicle is moving in the wrong direction.

In another feature, the method further comprises modifying parameters of an automated braking system of the vehicle in response to detecting that the vehicle is moving in the wrong direction.

In another feature, the method further comprises selectively notifying a cloud based monitoring system that the vehicle is moving in the wrong direction.

In another feature, the method further comprises selectively sending a message to a V2X communication system that the vehicle is moving in the wrong direction.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
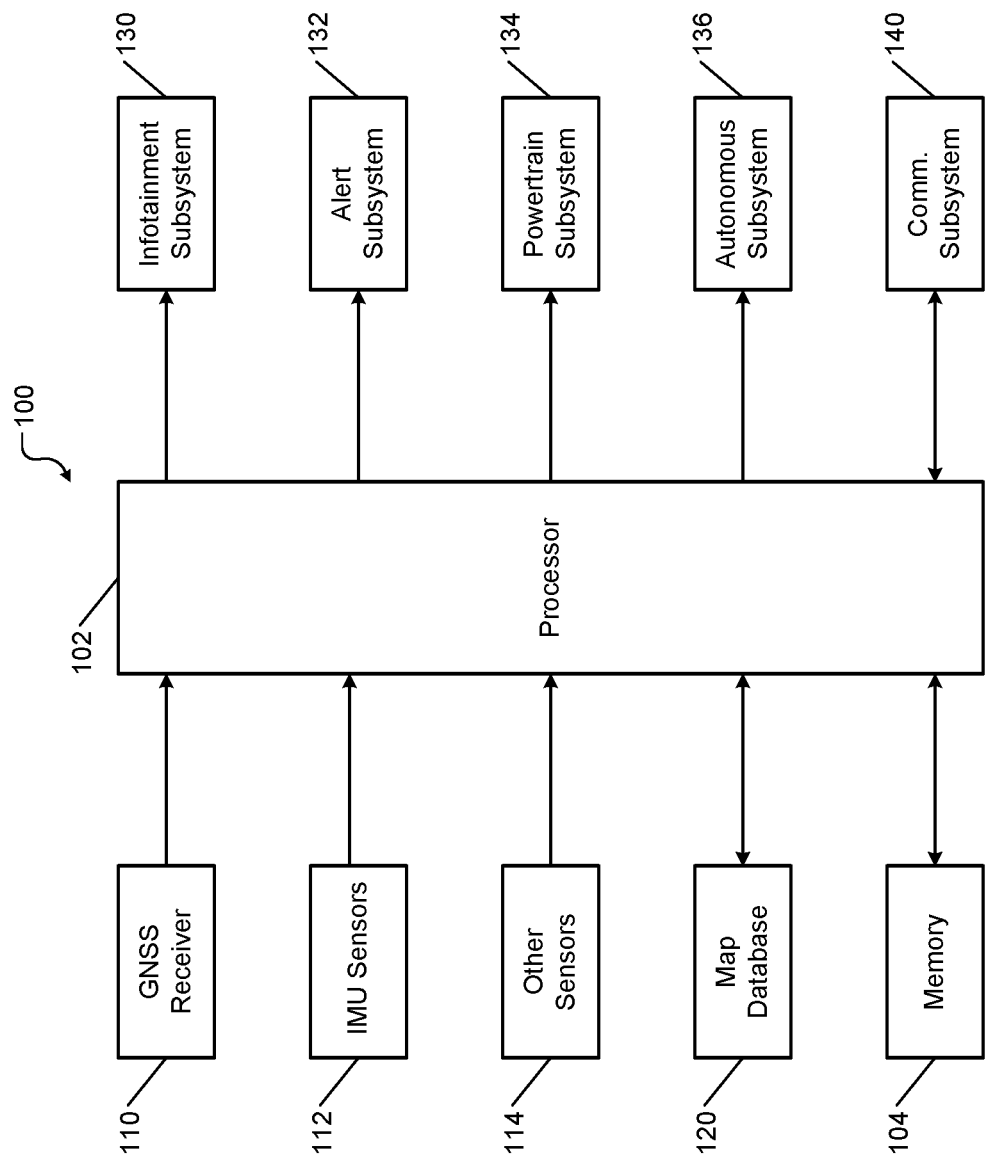
FIG. 1 is a block diagram of a system for detecting wrong-way driving and collision mitigation according to the present disclosure.

Current vehicle control systems rely on availability of advanced sensors like cameras, V2X communication, and so on to warn drivers if a vehicle is in a wrong lane. V2X or Vehicle-to-everything communication is a communication between a vehicle and any entity that may affect, or may be affected by, the vehicle. V2X is a vehicular communication system that incorporates other more specific types of communications such as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). These control systems, however, are not robust to effectively mitigate head-on crashes.

The system of the present disclosure detects whether a vehicle is driving the wrong way (i.e., in a wrong direction such as entering a freeway via an exit ramp, driving in an opposite direction on a one-way street, etc.). The system uses a combination of sensor data and map database for robustness. If wrong-way driving is detected with high level of certainty, the system deploys a multitude of counter-measures to mitigate head-on collision or alleviate severity of a head-on collision.

Specifically, the system detects wrong-way driving using various resources. For example, the resources include offline (or online) map database, Global Navigation Satellite System (GNSS), Inertial Measurement Unit (IMU) sensors, and optionally other sensors in the vehicle. GNSS refers to a constellation of satellites that transmit positioning and timing data to GNSS receivers. A receiver in a vehicle uses the positioning and timing data to determine the location of the vehicle. The GNSS system may be augmented by secondary corrections via ground based stations or other systems. The corrections improve the positioning accuracy of the GNSS based positioning system. However, position alone is insufficient to quickly and accurately detect wrong-way driving. The direction in which the vehicle is moving needs to be additionally and quickly determined. While GNSS provides position information (i.e., location of a vehicle), the IMU sensors in a vehicle provide directional information (i.e., the direction in which the vehicle is moving). Examples of IMU sensors include accelerometers, gyroscopes, magnetometers, etc.

In addition to the sensor data, the system uses dead-reckoning (prior N second navigation state history of the vehicle which includes position, direction, attitude, altitude, etc.) to establish the direction of the vehicle and compares it with the expected direction of the road, which can be determined from a map database. In navigation, dead-reckoning is the process of calculating current navigation state of a moving object by using a previously determined navigation state by using estimations of speed, heading direction, and course over an elapsed time. The system ultimately provides (to the driver and/or a vehicle control system) a set of actions that are practical and immediately implementable to mitigate head-on crashes when wrong-way driving is detected.

Notably, the state of the art does not consider dead-reckoning to detect wrong-way driving. Instead, the state of the art relies on detecting wrong-way signs, signals, and other visual cues. These indicia not only require high resolution sensors and extensive computations for detection but are also not always reliable. Further, the state of the art issues warnings to the wrong-way driver, issues messages via communication to other vehicles, but does nothing to alert other vehicles in the vicinity when there is no communication system. The state of the art also does not include any powertrain related counter-measures.

The system of the present disclosure detects wrong-way driving using a map-database in conjunction with positioning and inertial measurement sensors. The system uses immediately preceding N seconds of history of the vehicle's motion to improve detection accuracy. The system checks a measured driving direction, grade, lane, etc. against a predicted driving direction, grade, and lane, etc. using a high definition (HD) map to detect wrong-way driving.

The system includes a strategy to prevent collisions through a multi-prong approach. For example, the system controls the vehicle's powertrain by limiting maximum speed, engaging automated braking system, etc. The system controls the vehicle's safety system by expecting an impending crash and modifying automated braking system parameters to prevent a probable head-on collision. The system provides driver alerts (e.g., visual, audible, and/or tactile alerts). The system alerts other vehicles on the road by performing one or more of the following: turning on the vehicle's hazard lights, flashing the vehicle's headlights, sounding the vehicle's horn, alerting a cloud-based monitoring service that other vehicles may subscribe to, and transmitting a V2X message that the vehicle is driving wrong-way. Further, the system can be used as a watchdog in autonomous vehicles to detect and inform a vehicle occupant and/or a vehicle control system of wrong-way driving. These and other features of the system of the present disclosure are described below in detail.

FIG. 1 shows a system 100 that can be implemented in a vehicle for detecting wrong-way driving and collision mitigation. The system 100 comprises a processor 102, a memory 104, a plurality of sensors (110, 112, 114), and a plurality of vehicle control subsystems (130, 132, 134, 136, 140). For example, the plurality of sensors comprise a GNSS receiver 110, IMU sensors 112 (e.g., accelerometers, gyroscopes, magnetometers), and other sensors 114 in the vehicle (e.g., speed sensor, brake sensors, wheel sensors, etc.). For example, the plurality of vehicle control subsystems comprise an infotainment subsystem 130, an alert subsystem 132, a powertrain subsystem 134, an autonomous subsystem 136, and a communication subsystem 140. The system 100 comprises a map database 120.

Briefly, the infotainment subsystem 130 may include audiovisual aids for vehicle occupants. The alert subsystem 132 may control the vehicle's lights, horn, tactile alerting features, and so on. The powertrain subsystem 134 may control transmission, braking, and other related subsystems of the vehicle. The autonomous subsystem 136 may control autonomous or semi-autonomous mode of driving the vehicle. The communication subsystem 140 may include cellular, satellite, and other communication subsystems for communicating with other vehicles via V2X systems, for communicating with a server in a cloud (e.g., to access a map database and/or to periodically update the map database 120 in the vehicle), and so on. These elements of the system 100 may communicate with each other via a communication network such as Controller Area Network (CAN bus) or Ethernet in the vehicle.

The system 100 is now described in detail with additional references to methods 200, 250, 300, and 350 shown in FIGS. 2-5. The system 100 performs the methods 200, 250, 300, and 350. The method 200 shows an overview of a wrong-way driving detection and collision mitigation performed by the system 100. The methods 250, 300, and 350 show specific features of the method 200 in further detail.

Figure 2:
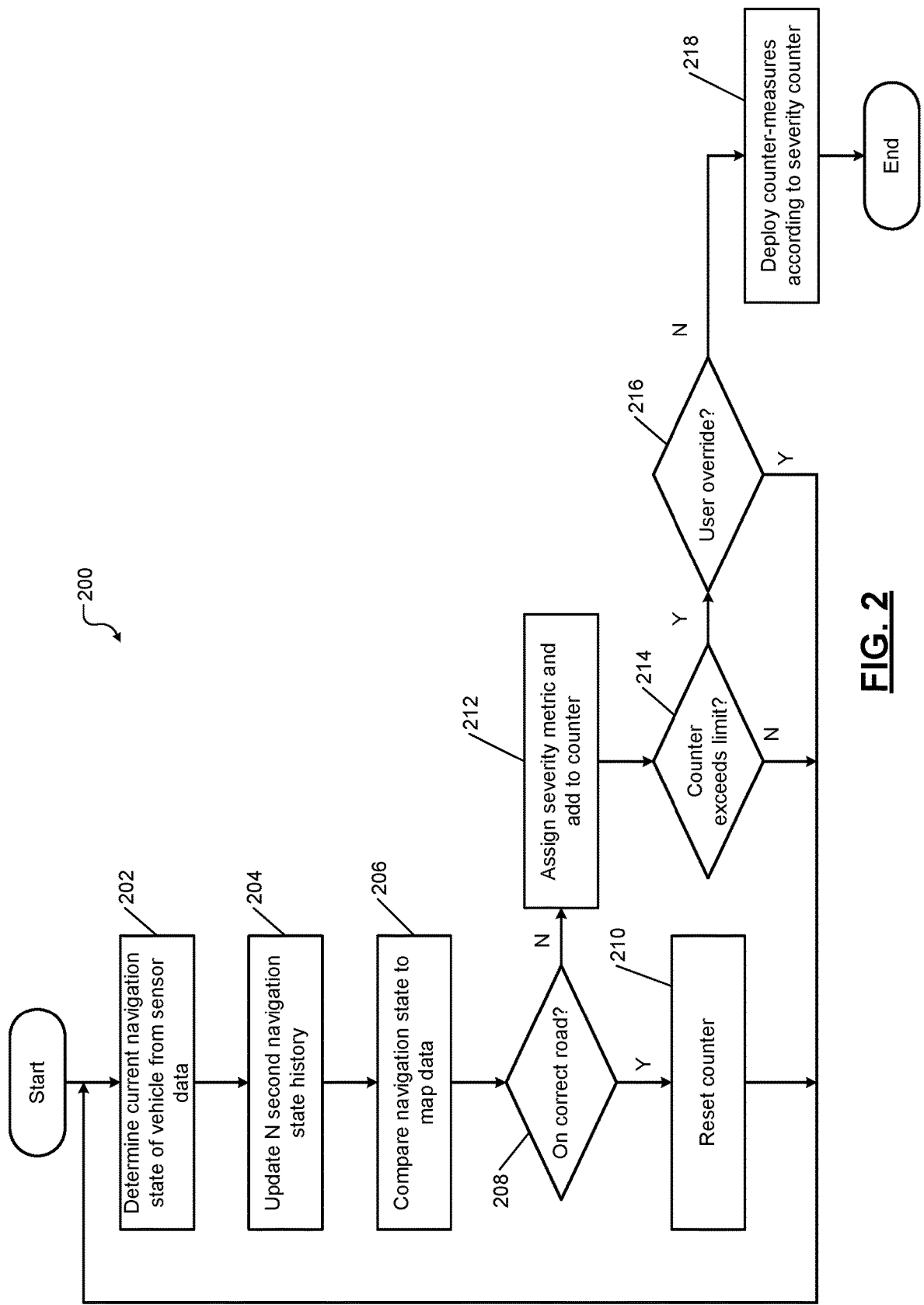
FIG. 2 is a flowchart of a method for detecting wrong-way driving and collision mitigation according to the present disclosure.

In FIG. 2, at 202, the processor 102 determines a current navigation state of the vehicle. A navigation state of the vehicle includes position (i.e., location), direction of motion, speed, and attitude of the vehicle (i.e., orientation of the vehicle; for example, whether the vehicle is moving uphill or downhill). The processor 102 determines the position of the vehicle based on the GNSS data received by the GNSS receiver 110 for a GNSS system. The processor 102 determines the direction in which the vehicle is moving and the attitude of the vehicle based on the data received from the IMU sensors 112. The processor 102 receives the speed of the vehicle from the speed sensor (e.g., 114). For example, the processor 102 determines the navigation state of the vehicle once per second or at any other suitable frequency. The navigation state determination is described below in further detail with reference to FIG. 3.

At 204, the processor 102 updates an N second navigation state history of the vehicle with the current navigation state of the vehicle. For example, N may be 10 or any other suitable number. At any time, the N second navigation state history provides a navigation state history of the vehicle in the immediately preceding N seconds. The N second navigation state history is used as dead-reckoning for determining the navigation state of the vehicle as explained below in further detail with reference to FIG. 3.

At 206, the processor 102 compares the current navigation state of the vehicle to the data in the map database 120. For example, the map database 120 may be locally stored in the vehicle. Alternatively, the map database 120 may be stored in a server in a cloud. The processor 102 can access the map database 120 in the cloud via the communication subsystem 140. The map database 120 in the vehicle can be periodically updated by receiving updates from the map database 120 in the cloud via the communication subsystem 140.

For the current position (i.e., location) of the vehicle indicated in the current navigation state of the vehicle, the map database 120 can provide details about the vehicle's location. Non-limiting examples of the details include the following: current lane, current lane's allowed travel direction, current road-grade, road segment type (e.g., freeway ramp, N-lane road, divided highway, driveway, etc.), road speed limit, and real-time traffic data (e.g., construction, road closures, detours, etc.).

At 208, based on the comparison between the current navigation state of the vehicle and the data in the map database 120, the processor 102 determines whether the vehicle is on the correct road (i.e., whether the detected direction of motion of the vehicle matches the direction in which driving is allowed on the roadway as inferred from the comparison between the current navigation state of the vehicle and the data in the map database 120). The comparison between the current navigation state of the vehicle and the data in the map database 120 and the determination whether the vehicle is on the correct road made based on the comparison are explained below in further detail with reference to FIG. 4.

If the vehicle is moving in the allowed direction on the roadway, at 210, the processor 102 resets a counter. For example, the counter may be stored in the memory 104. As explained blow, the counter is updated several times every second and is used to detect wrong-way driving. After resetting the counter, the method 200 returns to 202.

If the vehicle is not moving in the allowed direction on the roadway, at 212, the processor 102 detects the violation and assigns a severity metric to the detected violation. The processor 102 generates the severity metric based on the comparison between the current navigation state of the vehicle and the data in the map database 120. The severity metric indicates a severity level of the detected violation. The severity metric is granular (i.e., graded) and depends on various factors (explained below). The severity metric is used to deploy commensurate mitigation procedures. The processor 102 adds the severity metric to the counter. The generation of the severity metric and updating of the counter are explained below in further detail with reference to FIG. 5.

At 214, the processor 102 determines whether the counter exceeds a predetermined limit. The predetermined limit is calibrated to not cause false alarms (e.g., when the vehicle briefly veers into a wrong lane while making a turn and then returns to proper lane, or when the vehicle quickly moves into the wrong lane to pass another vehicle on a divided highway and then returns to proper lane, etc.).

If the counter does not exceed the predetermined limit, the method 200 returns to 202, and the processor 102 continues to determine the current navigation state of the vehicle and update the N second position history. If the vehicle continues to move in the wrong direction, the processor 102 executes the loop 202, 204, 206, 208, 212, 214 multiple times per second, and quickly detects that the counter exceeds the predetermined limit.

If the counter exceeds the predetermined limit, at 216, the processor 102 checks if the driver has selected to override the system 100 (e.g., deliberately decided to drive in the wrong direction due to construction, accident, etc.). If the driver has selected to override the system 100, the method 200 returns to 202. If the driver has not selected to override the system 100, at 218, the processor 102 deploys one or more counter-measures according to the severity counter. Non-limiting examples of counter-measures include the following.

For example, the alert subsystem 132 and/or the infotainment subsystem 130 can issue an alert and advice to the driver in the form of visual, audible, and/or tactile alerts. The alert subsystem 132 and/or the infotainment subsystem 130 can also advise the driver regarding mitigation strategies. Additionally, the alert subsystem 132 can alert other vehicles in the vicinity. For example, the alert subsystem 132 may perform one or more of the following functions: turn on hazard lights, flash headlights, and/or intermittently sound the horn of the vehicle. Additionally, the communication subsystem 140 may transmit a message indicating that the vehicle is moving in the wrong direction to the V2X communication system.

Further, depending on the severity counter, the powertrain subsystem 134 may perform one or more of the following functions: reduce and/or limit the speed at which the vehicle can move, change transmission state (e.g., lower gear), engage automated brake system (e.g., pull over the vehicle to the roadside), etc. Further, the autonomous subsystem 136 may engage a safety mechanism such as modify automated braking system parameters to avoid a probable head-on collision.

Figure 3:
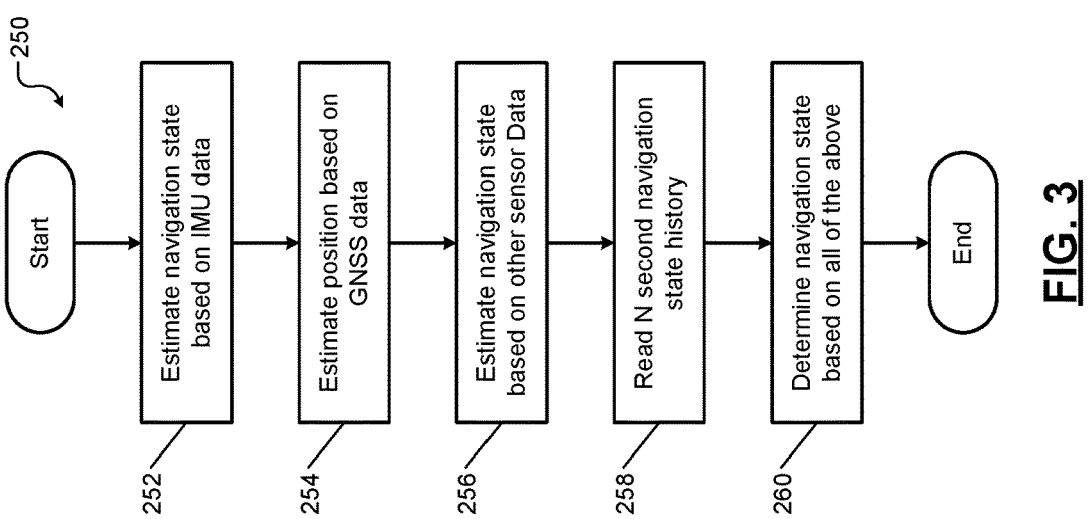
FIG. 3 is a flowchart of a method for determining a navigation state of a vehicle.

FIG. 3 shows the method 250 that the processor 102 performs to determine the navigation state of the vehicle. In the method 250, as explained below, the processor 102 processes data provided by different sensors and estimates a navigation state of the vehicle based on the data from each sensor. The processor 102 then combines the estimates and determines the navigation state of the vehicle. Due to the use of data from various sensors, the navigation state of the vehicle is more robust than if the navigation state is determined based on data from a single sensor. The robustness is further increased by using dead-reckoning as explained below in further detail.

At 252, the processor 102 estimates the navigation state of the vehicle based on data received from the IMU sensors 112. For example, the accelerometers can indicate vehicle acceleration; the gyroscopes can indicate the vehicle's rotational motion (e.g., turns) and attitude (i.e., orientation; e.g., whether the vehicle is moving uphill or downhill); and the magnetometers can indicate the direction in which vehicle is pointing. This type of information is not available in the data received from the GNSS receiver 110, which can provide only position (i.e., location and altitude) of the vehicle.

At 254, the processor 102 estimates the position of the vehicle based on the data received from the GNSS receiver 110. The processor 102 may further refine the position of the vehicle (e.g., from a resolution of a few meters down to a few centimeters) based on correction data received from local ground stations, which, being immobile, provide indication about offsets or errors in the GNSS positioning signals. The corrections may be received from other information sources as well, which include Internet based correction providers. The processor 102 can adjust the position of the vehicle determined based on the GNSS data received from the GNSS receiver 110 by combining the correction data received from a local ground station and can determine the position (i.e., location) of the vehicle with high accuracy.

At 256, the processor 102 estimates the navigation state of the vehicle based on the data received from the other sensors 114 of the vehicle. For example, the processor 102 can process data from speed and braking sensors in the vehicle to determine how much the vehicle has moved in a given amount of time, which can help in determining the navigation state of the vehicle.

In addition, at 258, the processor 102 estimates the navigation state of the vehicle by using the prior N second navigation state history of the vehicle. The N second navigation state history provides navigation state information (i.e., dead-reckoning) that helps the processor 102 in detecting the vehicle's movement in the wrong direction much earlier than the GNSS system. For example, if a vehicle enters an exit ramp of a freeway to get on the freeway, the vehicle will have traveled much farther down the exit ramp by the time the GNSS system can detect the vehicle's position on the exit ramp. In contrast, due to the availability of recent positions from the N second navigation state history, which may be updated several times every second, the processor 102 can detect that the vehicle has entered the exit ramp as soon as the vehicle enters the exit ramp, sooner than the GNSS system.

As another example, when turning left onto a multilane roadway, the processor 102 can detect sooner than the GNSS system if the vehicle has made a sharper turn (or a wider turn if turning right onto the multilane roadway) and has entered the wrong lane based on the data from the IMU sensors and the N second navigation state history. At 260, the processor 102 combines all of the above estimates and the N second navigation state history of the vehicle to accurately determine the navigation state of the vehicle that the method 200 uses to compare to the map database 120.

Figure 4:
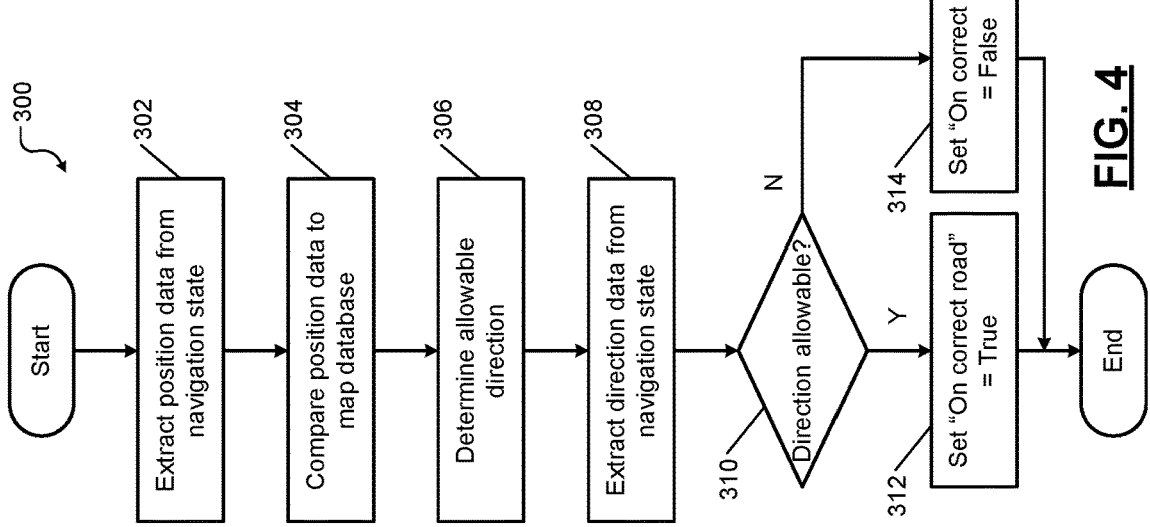
FIG. 4 is a flowchart of a method for comparing the navigation state of the vehicle to a map database to detect wrong-way driving.

FIG. 4 shows the method 300 that the processor 102 performs to compare the current navigation state of the vehicle to the map database 120 and to determine whether the vehicle is on the correct road (i.e., driving in the correct direction permitted on the road). At 302, the processor 102 extracts the position data of the vehicle from the current navigation state of the vehicle (determined in the methods 200 and 250).

At 304, the processor 102 uses the position data of the vehicle extracted from the current navigation state of the vehicle and the data from the map database 120 to determine additional details about the location of the vehicle. Specifically, for the current position (i.e., location) of the vehicle indicated in the current navigation state of the vehicle, the data from map database 120 can indicate one or more of the following additional details about the location of the vehicle: current lane, current lane's allowed travel direction, current road-grade, road segment type (e.g., freeway ramp, N-lane road, divided highway, driveway, etc.), road speed limit, and real-time traffic data (e.g., construction, road closures, detours, etc.).

At 306, from these additional details, the processor 102 can infer an allowable set of vehicle navigation states (e.g., direction and attitude or grade) for the current position (i.e., location) of the vehicle. For example, for the current position (i.e., location) of the vehicle, the processor 102 can infer from these additional details whether the vehicle should be moving north and uphill.

At 308, the processor 102 extracts the direction and attitude data of the vehicle from the current navigation state of the vehicle. At 310, the processor 102 compares the vehicle's expected or allowed direction and attitude, which are inferred at 306 from the comparison of the vehicle's position to the map database 120, to the vehicle's actual direction and attitude data, which is extracted from the determined current navigation state of the vehicle.

If the vehicle's the actual direction and attitude data are consistent with the expected direction and attitude, at 312, the processor 102 determines that the vehicle is on the correct road (i.e., the direction in which the vehicle is moving matches the direction in which driving is allowed on the roadway). The processor 102 may set a flag "On correct road" to true. If the vehicle's the actual direction and attitude data are inconsistent with the expected direction and attitude, at 314, the processor 102 determines that the vehicle is not on the correct road (i.e., the direction in which the vehicle is moving does not match the direction in which driving is allowed on the roadway; or, the vehicle is headed the wrong way). The processor 102 may set the flag "On correct road" to false.

Figure 5:
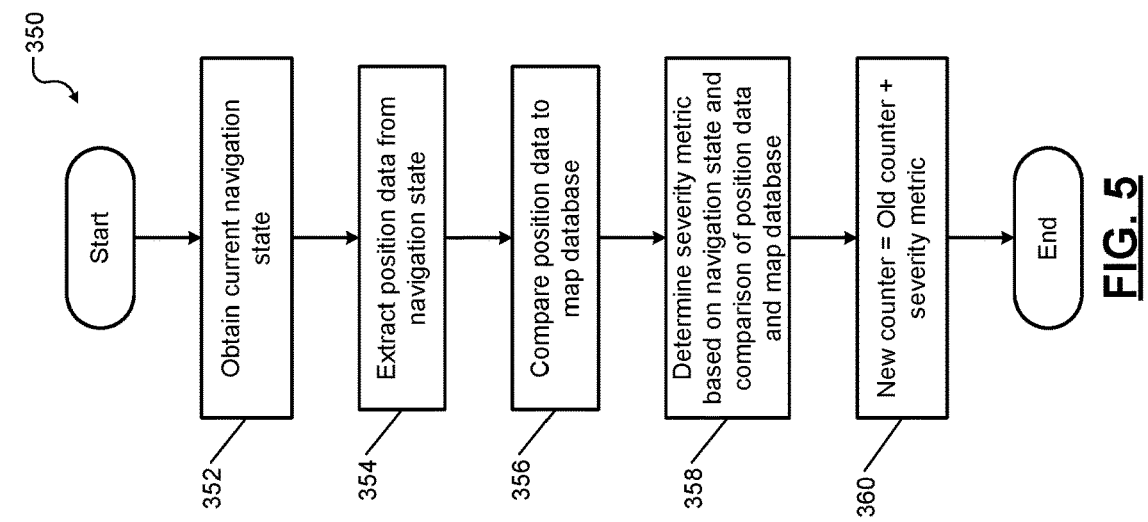
FIG. 5 is a flowchart of a method for assigning a severity metric to detected wrong-way driving.

FIG. 5 shows the method 350 that the processor 102 performs to generate the severity metric and update of the counter. At 352, the processor 102 obtains the current navigation state of the vehicle. At 354, the processor 102 extracts the position data of the vehicle from the current navigation state of the vehicle. At 356, the processor compares the position data extracted from the current navigation state of the vehicle to the map database 120 and determines the additional details about the location of the vehicle as described above with reference to the method 300.

At 358, if the vehicle is not moving in the allowed direction on the roadway, the processor 102 assigns a severity metric to the detected violation. The processor 102 generates the severity metric based on the comparison between the current navigation state of the vehicle and the additional details inferred from the comparison of the position data of the vehicle and the data in the map database 120.

The severity metric is generated using a model that is calibrated based on various factors and their combinations. For example, the factors may include the type of roadway being wrongly traveled, the speed limit on the roadway being wrongly traveled, the time of the day when the roadway is being wrongly traveled, the weather conditions when the roadway is being wrongly traveled, road construction or other construction or maintenance activity on the roadway being wrongly travelled, other specific information about portions of the roadways (e.g., intersections, exit/entry ramps, etc.) as being accident-prone, and so on.

For example, traveling in a wrong direction on a freeway when there is light traffic may be less severe than during heavy traffic; traveling in a wrong direction on a downtown street with a lower speed limit may be less severe than traveling in a wrong direction on a freeway; traveling in a wrong direction in bad weather may be more severe than traveling in a wrong direction in clear weather; and so on.

For example, if the processor 102 detects that the vehicle is using a wrong lane briefly to pass another vehicle at a high speed, the severity metric will be lower than if the vehicle is continuing to enter a freeway via an exit ramp albeit at a low speed. For example, the severity metric may be higher than at other intersections if the processor 102 detects that the vehicle is using a wrong lane at an intersection known to have higher accident rates. Many such and other factors can be heuristically included in calibrating the model that the processor 102 uses to assign severity metrics to detected violations.

At 360, the processor 102 adds the severity metric to the counter. That is, the new counter value is a sum of the previous counter value and the severity metric assigned to the vehicle's current navigation state. In other words, the severity metric accumulates each time the processor 102 executes the loop 202, 204, 206, 208, 212, 214 in the method 200.

Accumulating the severity metric helps in rapidly confirming whether the vehicle is in fact progressing in the wrong direction, in which case the severity level (i.e., the counter value) will quickly increase and exceed the predetermined threshold; and the processor 102 can promptly deploy mitigation procedures with certainty. If the vehicle briefly travels in the wrong direction and quickly returns to the proper lane (e.g., after passing a vehicle, after the driver or the autonomous subsystem realizes the mistake, etc.), the counter will not exceed the predetermined threshold, and no mitigation will be necessary.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a processor; and
a memory storing instructions which when executed by the processor configure the processor to:
receive data from a plurality of sensors in a vehicle, the sensors including a Global Navigation Satellite System receiver, accelerometers, gyroscopes, and magnetometers;
determine a location of the vehicle and a direction of motion of the vehicle based on both (i) the data received from the plurality of sensors in the vehicle and (ii) a history of locations of the vehicle in prior N seconds, where N is a number greater than 0;
determine a permitted driving direction for the vehicle based on the location of the vehicle and a map database;
reset a counter when the vehicle is moving in the permitted driving direction;
update the counter while the vehicle is moving;
determine whether the counter exceeds a predetermined limit;
determine if an override feature is selected; and
detect whether the vehicle is moving in a wrong direction based on the permitted driving direction and the direction of motion of the vehicle in response to the counter exceeding the predetermined limit while the override feature is unselected.

2. The system of claim 1 wherein the processor is further configured to determine the location of the vehicle based on additional data received from a ground station associated with the Global Navigation Satellite System.

3. The system of claim 1 wherein the processor is further configured to:
determine an attitude of the vehicle based on the data;
receive a grade for the location of the vehicle from the map database; and
detect whether the vehicle is moving in the wrong direction additionally based on attitude of the vehicle and the grade for the location of the vehicle.

4. The system of claim 1 wherein in response to detecting that the vehicle is moving in the wrong direction, the processor is further configured to:
generate a severity metric based on the location of the vehicle and at least one of speed of the vehicle, type of roadway, time of the day, traffic, weather, and construction information; and
generate an alert based on the severity metric.

5. The system of claim 1 wherein the processor is further configured to alert an occupant of the vehicle using one or more of audio, video, and tactile alerts in response to detecting that the vehicle is moving in the wrong direction.

6. The system of claim 1 wherein the processor is further configured to at least one of turn on hazard lights, sound a horn, and flash headlights of the vehicle in response to detecting that the vehicle is moving in the wrong direction.

7. The system of claim 1 wherein the processor is further configured to at least one of reduce speed of the vehicle, limit maximum speed of the vehicle, and engage automated braking system of the vehicle in response to detecting that the vehicle is moving in the wrong direction.

8. The system of claim 1 wherein the processor is further configured to modify parameters of an automated braking system of the vehicle in response to detecting that the vehicle is moving in the wrong direction.

9. The system of claim 1 wherein the processor is further configured to selectively notify a cloud based monitoring system that the vehicle is moving in the wrong direction.

10. The system of claim 1 wherein the processor is further configured to selectively send a message to a V2X communication system that the vehicle is moving in the wrong direction.

11. A method comprising:
receiving data from a plurality of sensors in a vehicle, the sensors including a Global Navigation Satellite System receiver, accelerometers, gyroscopes, and magnetometers;
determining a location of the vehicle and a direction of motion of the vehicle based on both (i) the data received from the plurality of sensors in the vehicle and (ii) a history of locations of the vehicle in prior N seconds, where N is a number greater than 0;
determining a permitted driving direction for the vehicle based on the location of the vehicle and a map database;
resetting a counter when the vehicle is moving in the permitted driving direction;
updating the counter while the vehicle is moving;
determining whether the counter exceeds a predetermined limit;
determining if an override feature is selected; and
detecting whether the vehicle is moving in a wrong direction based on the permitted driving direction and the direction of motion of the vehicle in response to the counter exceeding the predetermined limit while the override feature is unselected.

12. The method of claim 11 further comprising determining the location of the vehicle based on additional data received from a ground station associated with the Global Navigation Satellite System.

13. The method of claim 11 further comprising:
determining an attitude of the vehicle based on the data;
receiving a grade for the location of the vehicle from the map database; and
detecting whether the vehicle is moving in the wrong direction additionally based on attitude of the vehicle and the grade for the location of the vehicle.

14. The method of claim 11 further comprising in response to detecting that the vehicle is moving in the wrong direction:
generating a severity metric based on the location of the vehicle and at least one of speed of the vehicle, type of roadway, time of the day, traffic, weather, and construction information; and
generating an alert based on the severity metric.

15. The method of claim 11 further comprising alerting an occupant of the vehicle using one or more of audio, video, and tactile alerts in response to detecting that the vehicle is moving in the wrong direction.

16. The method of claim 11 further comprising at least one of turning on hazard lights, sounding a horn, and flashing headlights of the vehicle in response to detecting that the vehicle is moving in the wrong direction.

17. The method of claim 11 further comprising at least one of reducing speed of the vehicle, limiting a maximum speed of the vehicle, and engaging automated braking system of the vehicle in response to detecting that the vehicle is moving in the wrong direction.

18. The method of claim 11 further comprising modifying parameters of an automated braking system of the vehicle in response to detecting that the vehicle is moving in the wrong direction.

19. The method of claim 11 further comprising selectively notifying a cloud based monitoring system that the vehicle is moving in the wrong direction.

20. The method of claim 11 further comprising selectively sending a message to a V2X communication system that the vehicle is moving in the wrong direction.

* * * * *